W. C. CLARKE.
HAMMOCK BED.
APPLICATION FILED MAY 25, 1914.
1,152,006.
Patented Aug. 31, 1915.
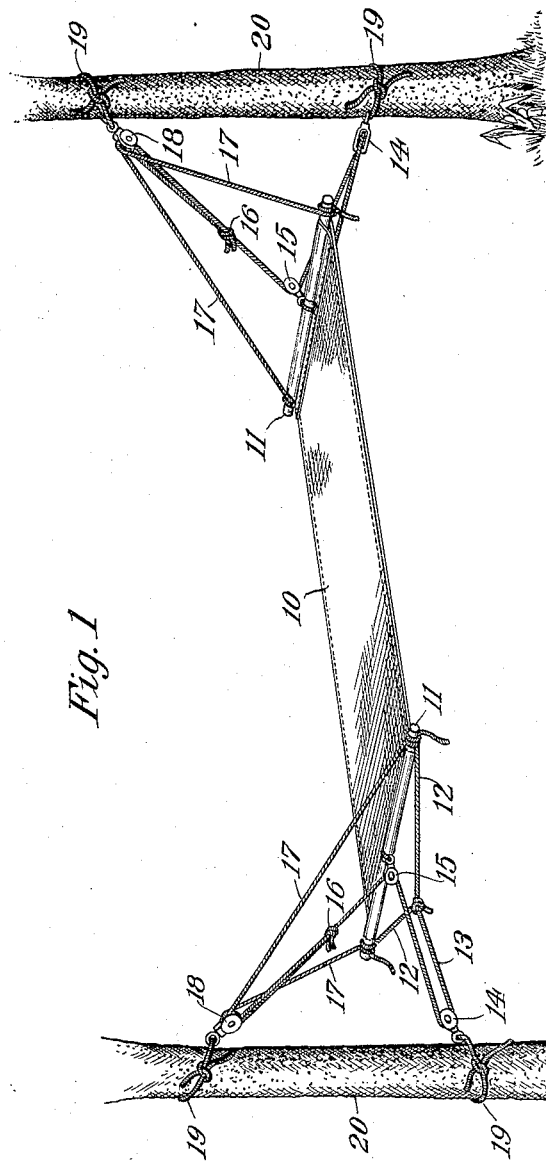
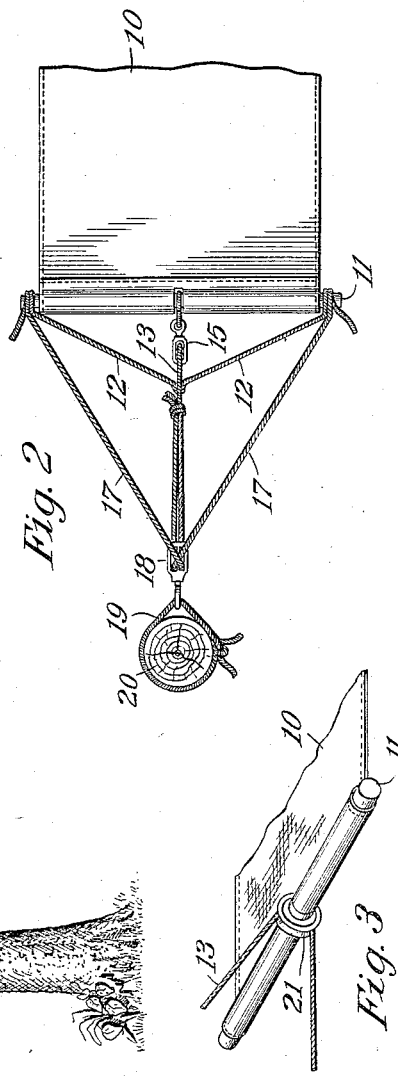
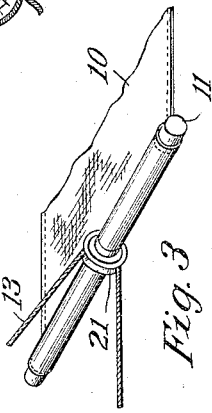
W. C. Clarke
Inventor

UNITED STATES PATENT OFFICE.

WILLIAM C. CLARKE, OF NEW YORK, N. Y.

HAMMOCK-BED.

1,152,006.  Specification of Letters Patent.  Patented Aug. 31, 1915.

Application filed May 25, 1914. Serial No. 840,759.

*To all whom it may concern:*

Be it known that I, WILLIAM C. CLARKE, a citizen of the United States, residing at New York, in the county and State of New York, have invented certain new and useful Improvements in Hammock-Beds, of which the following is a full, clear, and exact description.

This invention relates to beds of the suspended or hammock type, and its chief object is to provide improved suspending means therefor, by which the bed can be easily positioned at any desired height above the ground.

A further object is to provide suspending means which shall prevent swinging of the bed and diminish sagging, thereby making the bed more comfortable in use.

To these and other ends the invention consists in the novel features of construction and combinations of elements hereinafter described.

One form of the invention is illustrated in the accompanying drawing, in which—

Figure 1 is a perspective view of the complete bed. Fig. 2 is a detail plan view of one end. Fig. 3 is a detail perspective view of a modification.

The bed proper is of the hammock type, and in the form shown is composed of a suitable fabric 10 of rectangular shape, connected at its ends to transverse bars or spreaders 11. The branches 12 of the ropes 13 are attached to the ends of the spreaders in any convenient manner, while the ropes 13 themselves pass upwardly through the lower suspending-blocks 14, then inwardly (that is, toward the hammock) to the spreader or center blocks 15. Passing upwardly through the blocks 15, the ropes 13 branch, as at 16, and the branches 17, passing upwardly through the upper suspending blocks 18, extend downwardly to the spreaders and have their ends releasably fastened to the ends of the latter in any convenient manner. The suspending blocks 14, 18, are attached in any convenient way, as by lashings 19, to any suitable supports, for example, two trees 20.

One of the most important features of the suspending means described is the fact that to tighten the bed, or to level it, or vary its position above the ground, it is not necessary to adjust or distort the lashings 19 or such other means as may be used to fasten the suspending-blocks to the supports, though this method can of course be resorted to if desired. The most convenient method is to leave the said fastening means as they happen to be, and make the necessary adjustment by taking in or letting out the branch-ropes 12, or 17, or both, at one or both ends of the bed, as may be necessary or desirable. The blocks 14, 18, may be at any position with respect to the height of the bed, but I prefer to have the blocks 14 below the level of the bed, so as to prevent swinging of the latter.

The upper blocks 18 are preferably double, that is, each is provided with two sheaves, and the branch-ropes 17 are preferably crossed after passing through the respective blocks, as shown more clearly in Fig. 2. This crossing of the ropes causes them to bind on each other, and the resulting friction, when a load is placed on the bed, diminishes the play of the ropes through the blocks, which in turn diminishes sagging and keeps the hammock more nearly level, especially since the hammock cannot swing to any material extent. In lieu of the blocks 14, 15, 18, rollers or other suitable devices may be used. For example, in Fig. 3 I show a roller or sheave 21 rotatably mounted on the spreader 11, in place of the block 15.

The bed is particularly advantageous for campers' use, as it can be quickly set up, has no part in contact with the ground, and can be suspended from any suitable uprights, as for example, two trees, two tent poles, or two stakes driven into the ground.

It is to be understood that the invention is not limited to the precise construction illustrated, but can be embodied in other forms without departure from its proper spirit and scope.

I claim:

1. The combination of two uprights spaced apart, a hammock extending horizontally between the uprights and having transverse spreaders at its ends, pulley-blocks fastened to the uprights above the hammock, pulley-blocks attached to the spreaders at the centers thereof, and two branched ropes at the ends of the hammock, each connected to one of the uprights below the hammock, then running upwardly through the block at the center of the spreader up to the pulley block on the upright and thence downwardly over the pulley block and having its branches attached to the ends of the spreader.

2. The combination of a hammock having a transverse spreader at an end thereof, an intermediate block carried by the spreader at the center thereof, a double block above the intermediate block and a single lower block below the intermediate block adapted to be attached to a suitable support, a rope running through the intermediate block and having branches running through the double upper block and crossing one over the other at said block and connected to the ends of the spreader, said rope also running through the lower block and having branches connected to the ends of the spreader.

In testimony whereof I affix my signature in the presence of two subscribing witnesses.

WILLIAM C. CLARKE.

Witnesses:
T. NIELSEN,
M. GROSS, Jr.